United States Patent [19]

Kamman et al.

[11] 4,254,847
[45] Mar. 10, 1981

[54] RUBBER VISCOUS TORSIONAL DAMPERS AND METHOD OF MAKING SAME

[75] Inventors: Gordon W. Kamman, Elma; Ronald L. McLean, Tonawanda, both of N.Y.

[73] Assignee: Houdaille Industries, Inc., Ft. Lauderdale, Fla.

[21] Appl. No.: 927,279

[22] Filed: Jul. 24, 1978

[51] Int. Cl.³ .............................................. F16F 15/12
[52] U.S. Cl. ........................................ 188/1 B; 74/574
[58] Field of Search ............................. 188/1 B; 74/574

[56] References Cited

U.S. PATENT DOCUMENTS

| | | | |
|---|---|---|---|
| 1,939,855 | 12/1933 | Kreis | 74/574 |
| 2,060,565 | 11/1936 | Geyer | 188/1 B |
| 2,636,399 | 4/1953 | O'Connor | 188/1 B |
| 3,303,719 | 2/1967 | Beier | 188/1 B |
| 3,410,369 | 11/1968 | Ishizuka | 188/1 B |
| 3,653,278 | 4/1972 | Brinkman | 74/574 |
| 3,843,188 | 10/1974 | Kirschner | 188/1 B |
| 3,990,324 | 11/1976 | Fishbaugh et al. | 188/1 B |
| 4,046,230 | 9/1977 | Troyer | 188/1 B |
| 4,098,373 | 7/1978 | Troyer | 188/1 B |
| 4,114,246 | 9/1978 | Kamman | 188/1 B |

FOREIGN PATENT DOCUMENTS

| | | | |
|---|---|---|---|
| 704796 | 3/1965 | Canada | 74/574 |
| 1264171 | 3/1968 | Fed. Rep. of Germany | 188/1 B |
| 2151366 | 4/1973 | Fed. Rep. of Germany | 188/1 B |

*Primary Examiner*—Edward R. Kazenske
*Attorney, Agent, or Firm*—Hill, Van Santen, Steadman, Chiara & Simpson

[57] ABSTRACT

Rubber viscous torsional dampers in which an annular inertia mass is coupled by elastic tuning spring, spacing and sealing rings to a radially outwardly extending circular body on a radially inner hub portion, have the elastic rings secured fixedly to axial surfaces of either or both the body and; the inertia mass by means of respective flat disks which are rigidly unyielding in plan and are permanently secured by vulcanized bonding to the rings, the disks being rigidly secured to the inertia mass and/or the body by structural adhesive.

13 Claims, 4 Drawing Figures

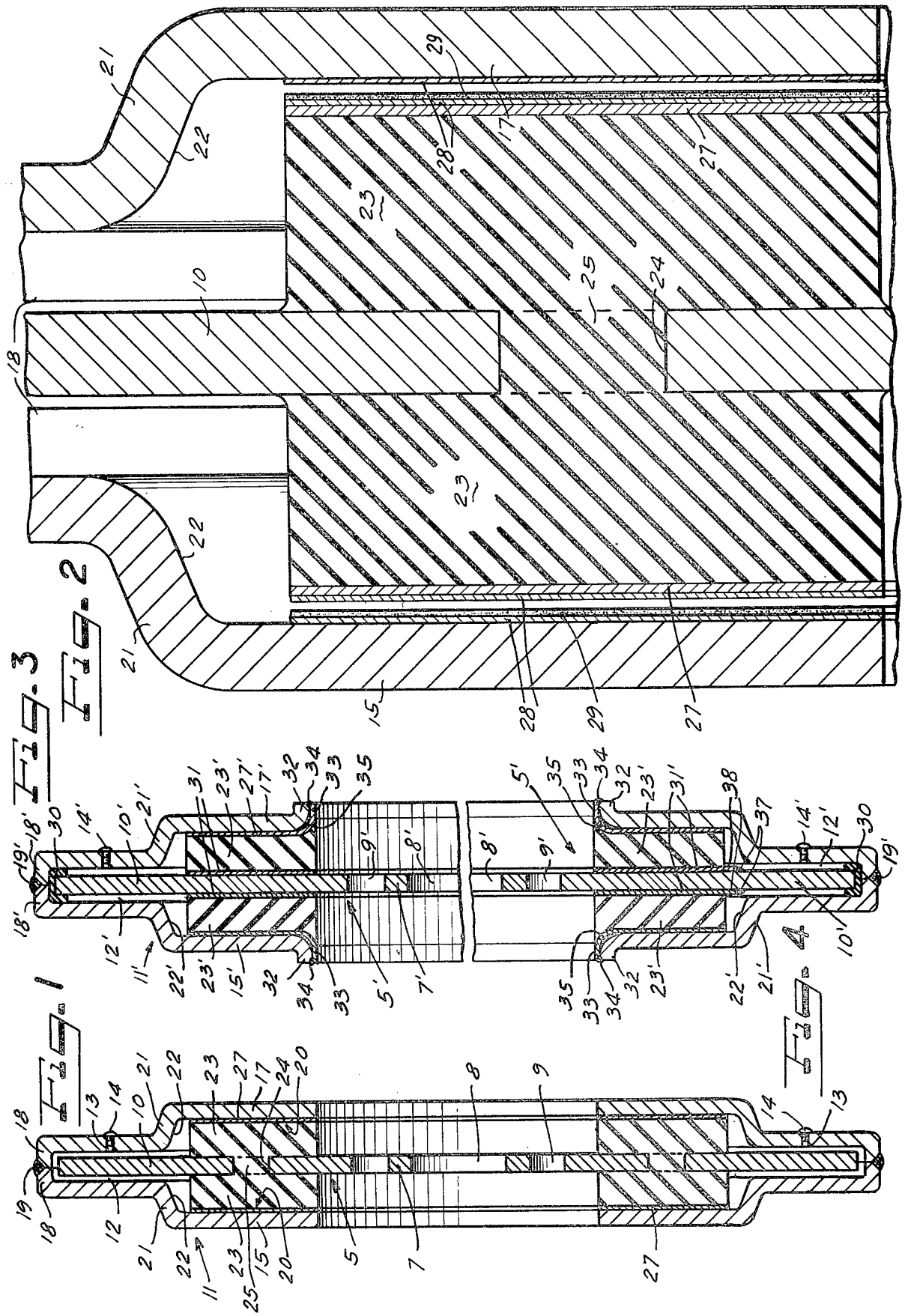

RUBBER VISCOUS TORSIONAL DAMPERS AND METHOD OF MAKING SAME

This invention relates to improvements in rubber viscous torsional dampers and method of making the same, and is more particularly concerned with dampers of this type in which an annular inertia mass is mounted on a radially extending combination damper disk and flange plate in which a body portion of the plate is in shear film working relation within the inertia mass, a radially inner portion of the plate providing a mounting hub for attachment to a rotary member such as a crankshaft subject to vibrations to be damped by the damper.

As is well known in the art, numerous advantages have been experienced with viscous torsional vibration dampers, that is dampers utilizing the phenomenon of resistance to shearing of a thin layer of viscous damping medium such as silicone fluid between relatively moving opposed parallel working surfaces in part corotative with a rotary member such as a crankshaft subject to torsional vibrations and in part carried by an inertia mass relatively torsionally movable with respect to the rotary member to be damped. One desirable form of such dampers comprises a disk-like flange structure having a hub portion to be attached to the rotary member to be damped and a radially extending body portion carrying a ring shaped inertia member having a working chamber enclosing an annular body portion of the disk flange structure, with surfaces of the disk body and the inertia member in shear film spaced relation having regard to the viscosity of the viscous damping medium which is sealed within the chamber by means of elastic tuning spring, spacing and sealing rings at the radially inner side of the working chamber.

According to several prior arrangements, of which U.S. Pat. No. 3,303,719 is representative, the sealing and spacing rings are located at juncture of the inertia member carrying portion of the mounting disk and axially extending flanges on the disk between the carrying portion and the hub portion. Such an arrangement affords little, if any, tuning advantage from the elastic rings.

As is well disclosed in U.S. Pat. No. 2,636,399 for example, an objectionable torsional vibration may occur at some speed within the normal operating speed range for the mass elastic system being damped; and to overcome this it is desirable to connect the damper inertia mass to the hub by means of rubber or rubber-like tuning spring means in such a fashion that the frequency of the spring and inertia mass is a certain percentage of the natural frequency of the entire mass elastic system, thereby providing a counteracting force which gives the damper hub and inertia mass significantly more relative movement than they would have without the tuning spring. Since the amount of friction work that can be done by the viscous damping elements and by the elastic tuning spring means is a function of the relative amplitude, dampers using the tuning spring means are capable of transforming more torsional vibratory energy into heat energy and are thus capable of reducing the torsional vibration amplitudes of the system to lower levels. This desirable effect is contingent upon being able to obtain the proper dimensions and location of the elastic spring means. In the forms of the damper shown in U.S. Pat. No. 2,636,399, the elastic tuning rings are enclosed within the working chamber in which the inertia mass is housed.

A damper arrangement wherein an annular inertia mass is carried on a mounting disk plate can attain some tuning advantage from the greater resistance to shear of elastic bodies as compared to viscous damping medium alone, as disclosed in U.S. Pat. No. 3,410,369. However, a serious deficiency in that disclosure is the difficulty in attaining concentricity of the elastic rings. In the examples disclosed in U.S. Pat. No. 3,410,369, the radially inner sides of the elastic rings are uncontrolled so that during assembly of the dampers the rings are liable to eccentric misplacement. Another disadvantage of the dampers disclosed in that patent is that there is either no bond between the rubber rings and the metal parts of the damper or if any bond is provided it is likely to be insecure.

Accordingly, it is an important object of the present invention to overcome the disadvantages, deficiencies, inefficiencies, shortcomings and problems inherent in prior dampers of the kind under consideration and to provide a new and improved construction and method in respect to such dampers.

In an embodiment of this invention, there is provided a tuned viscous torsional vibration damper assembly of the type having circular supporting plate means, a radially outwardly extending circular body and a radially inner hub portion adapted to be secured to a rotary member such as a crankshaft subject to vibrations to be damped by the damper, said body being received concentrically within a radially inwardly opening annular working chamber of an annular inertia mass, a viscous damping medium in said chamber between shear film spaced working surfaces of said body and said inertia mass, and said inertia mass having concentric annular grooves at opposite sides of and facing axially toward said body contiguous to the opening from said chamber, with elastic tuning spring, spacing and sealing rings coupling opposing surface areas of said inertia mass in said grooves and opposing surface areas on said body. On the axial face of each of the rings which confronts the opposing inertia mass surface and/or the supporting plate body a flat annular disk which is rigidly unyielding in its plane is vulcanize bonded to the ring. Adhesive means permanently rididly secure the remaining axial faces of the disks to the inertia mass and/or the supporting plate body.

It is also within the principles of the invention to not only vulcanize bond the elastic rings to the plate means body but also to lock the rings together and to the plate body by means of integral key lug extensions extending through keying holes in the plate body, and which holes are also useful to permit communication through the plate means body during molding and vulcanization of the elastic rings.

Further, according to the invention, a method of making the just described viscous torsional vibration damper assembly comprises vulcanize bonding at least one axial face of each of the elastic tuning spring, spacing, and sealing rings to a flat annular disk, which is rigidly unyielding in plan, and fixedly securing the disk to either or both of the plate means body and the inertia mass.

Other objects, features and advantages of the invention will be readily apparent from the following description of certain representative embodiments thereof, taken in conjunction with the accompanying drawing although variations and modifications may be effected without the disclosure, and in which:

FIG. 1 is a vertical sectional detail view through a damper embodying principles of the invention.

FIG. 2 is an enlarged fragmentary exploded assembly view illustrating the parts of the damper in their relative orientation for effecting assembly of the damper.

FIG. 3 is a view similar to FIG. 1, but showing certain modifications; and

FIG. 4 shows a further modification.

On reference to FIG. 1, a complete tuned viscous torsional vibration damper embodying the present invention comprises supporting plate means 5 desirably in the form of a flat metal plate of adequate strength and thickness or gauge for the intended purpose. A radially inner hub portion 7 of the plate 5 has means adapting it to be secured to a rotary member such as a crankshaft (not shown) subject to vibrations to be damped by the damper, a central clearance aperture 8 and an annular series of bolt holes 9 being provided for the purpose. A radially outwardly extending circular body portion 10 of the plate 5 is adapted to carry and cooperate with an annular inertia mass 11, which has a radially inwardly opening annular working chamber 12 within which the plate body 10 is received concentrically. A viscous damping medium such as a suitable viscosity silicone fluid is loaded into the chamber 12 between shear film spaced working surfaces of the body 10 and the inertia mass 12. Filling of the annular working chamber 12 with the viscous damping fluid is adapted to be effected through one of a pair of filler openings 13, which open into the chamber in diametrically spaced relation, one of the openings serving to receive the damping fluid therethrough, and the other serving as an air escape opening during the filling. After filling of the damper, the ports or openings 13 are, as is customary, hermetically sealed as by means of screws or welding 14.

Although the inertia mass housing 11 may be constructed from machined parts, in a preferred construction, the inertia mass comprises a pair of substantially identical mirror image annular heavy gauge metal stampings 15 and 17, respectively, each of which has at its radially outer perimeter a closure and spacing flange 18 angularly directed toward and abutting the edge of the companion flange 18 and fixedly secured in that relationship by any suitable means, such as seam welding 19, which also hermetically seals the joint at the abutting edges of the flanges. By proper dimensioning of the flanges 18 proper shear film spacing between the supporting plate body 10 and the inertia mass housing parts 15 and 17 is attained, having regard to the viscosity of the damping medium filled into the chamber 12.

In addition, each of the inertia mass housing members 15 and 17 is shaped to provide a concentric annular groove 20 complementary to the groove 20 of the other of the members such that opposite sides of the inertia mass body 11 have the grooves facing axially toward the plate body 10 contiguous to the radially inward opening from the working chamber 12. In the preferred construction, the grooves 20 are formed by offsetting the groove-defining radially inner annular portions of the inertia members 15 and 17 relative to the radially outer annular portions of the members 15 and 17, which define the working chamber 12. Respective generally oblique shoulders 21 connect the groove-defining and chamber-defining portions of the members 15 and 17 and define for the radially outer sides of the grooves 20 oblique radially outwardly sloping and generally convergently related surfaces 22.

Within the grooves 20 are assembled elastic tuning spring, spacing and sealing rings 23, which couple the opposing surface areas of the inertia mass 11 in the grooves 20 and the opposing surface areas on the supporting plate body 10. Each of the rings 23 is desirably on the order of two to six times as wide, considering the radial extent, as it is thick, considered in the axial extent. Each of the rings 23 desirably has its inner diameter substantially aligned coaxially with the inner diameter of the inertia member 15 or 17, with which associated whereby to avoid any dirt catching groove. Although the axial faces of the rings 23 are secured to the opposing axially facing surface areas of the inertia mass 11 and the plate body 10, both the radially inner and radially outer diameter surfaces of the rings 23 are free from contact with any other part of the damper assembly. This leaves the outer diameter surfaces of the rings 23 entirely free from imposition of any stress due to rubbing or friction during torsional damping action of the elastic rings. The space between the radially outer diameters of the rings 23 and the oblique surfaces 22 provides, in each instance desirably reservoir volume for the radially inner ends of the working chamber 12. The damper operates efficiently not only as a viscous damper, but also embodies desirable features of a tuned rubber damper.

Relative parallel movement between the working surfaces of the plate body 10 within the working chamber 12 and the opposed parallel working surfaces of the chamber-defining portions of the inertia members 15 and 17 is resisted by the viscous coupling provided by the viscous damping medium, because any relative parallel vibratory torsional movement causes laminar shearing of the viscous medium whereby energy is dissipated and vibrations are damped. Bg having the elastic rings 23 secured to the opposing faces of the plate body 10 and the inertia members 15 and 17, a desirable elastic tuning is attained by means of the elastic rings. It will be understood that by the term "elastic" is meant a rubber or rubber-like elastomeric material possessing the proper elasticity for the tuning function of the rings 23. At least on those surfaces of the rings 23 exposed to the viscous damping medium fluid in the working chamber 12, the rings 23 must be inert to the damping medium either by treatment of those surfaces or by selection of the material from which the rings are made. By way of example, materials which are suitable for the rings 23 are acrylic, vinyl acetate ethylene, fluorosilicone, fluorocarbon, and ethylene acrylic elastomers of about 65–75 durometer, Shore 'A' scale.

Optimum cooperative tuning function of both of the elastic rings 23 is assured by having them as nearly as practicable equal in all respects, including size, concentricity, composition, attachment to the other components of the other damper assembly and degree of compression where that may be effected. Efficient control of at least certain of these parameters is best attained by premolding the rings 23 by appropriate vulcanize molding techniques according to desired specifications pursuant to which each of the rings will be substantially equal to the other.

In the preferred embodiment, (FIGS. 1 and 2) the elastic rings 23 are premolded by vulcanization directly in place on the plate 5 concentrically relative to one another and to the plate and in proper orientation such that when assembled with the inertia mass 11, the inner diameters of the rings 23 will be substantially aligned with the inner edges of the inertia members 15 and 17.

By thus vulcanizing the rings directly on the plate 5 may suffice to maintain the rings permanently on the plate under all conditions that may reasonably be expected to be encountered in service. Even greater assurance against any even remote tendency toward displacement of the rings 23 relative to the plate 5 even under the most severe torsional stress conditions may be had by vulcanize keying the rings 23 integrally together through keying holes 24 extending through the plate 5 in preferably an annular series, substantially spaced from each radial edge of the rings. These holes 24 are also useful to permit communication through the plate means body during molding and vulcanization of the elastic rings. Where, for example, the diameter of the plate 5 is about 10 inches (263 millimeters), there may be twelve of the keying holes 24 of about 0.250 inch (6.350 mm) diameter, the rings 23 being about 7½ inch (190 millimeter) diameter and about one inch (2.5 cm) in width. An advantage of the integral vulcanize keying of the rings 23 to one another by means of keying lugs 25 through the keying holes 24 and bonding of the keying lugs 25 through the keying holes 24 and bonding of the keying lugs 25 to the surfaces defining the holes 24 is that the total area of the vulcanize bonding of the rings 23 to the plate 5 is increased and the vulcanized bonds of the rings with the axial faces of the plate are reinforced and relieved from taking the entire torsional stress in operation of the damper service. Where the rings 23 are thus anchored to the plate 5, the rings may be secured in any preferred manner such as by means of a structural adhesive, or the like, to the respective inertia mass members 15 and 17. The technique for such securement to the inertia mass may be substantially in accordance with the teaching in the pending application of Gordon W. Kamman, Ser. No. 811,256, filed June 29, 1977, now U.S. Pat. No. 4,114,246 the disclosure of which to any extent necessary is incorporated herein by reference, said application being assigned to the same assignee as the present application.

Some problems may be encountered in respect to attaining a sufficiently secure bond of the vulcanized elastic rings 23 to the inertia members 15 and 17 by means of available elastomer/metal adhesive or other bonding means because of possible incompatibility of the bonding material and the elastomer of the rings, whereas an assured secure bond can be attained by vulcanize bonding to any selected metal surfaces, e.g. the vulcanize bond effected between the rings 23 and the plate 5.

To alleviate the bonding problem between the rings 23 and the inertia members 15 and 17 to which bonding of the rings 23 is unreliable, at least where the rings are vulcanize bonded to the plate 5, a flat annular disk 27, which is rigidly unyielding in its plane, is vulcanize bonded to the face of each of the rings 23, which must confront the respective inertia member 15 or 17. In the assembly, the annular disk 27 in each instance is secured as by means of structural adhesive to the engaged surface of the respective inertia member 15 or 17, as the case may be. The annular disks 27 are preformed from a material which will not only adhere permanently to the elastic rings 23 by vulcanize bonding but which will adhere permanently to the attached inertia member 15 or 17 when secured by means of structural adhesive, adequately to resist separation under the most severe operating conditions to which the damper may be subjected. The disks 27 may be thin metal plates.

On reference to the exploded assembly view of FIG. 2, the parts of the damper are shown as concentrically oriented for final assembly. For this purpose, the elastic rings 23 will have been vulcanized and vulcanize bonded to the plate body 10 and the annular disks 27 in accordance with any preferred vulcanizing techniques, as a complete subassembly to be assembled with the preformed inertia members 15 and 17. In addition, prior to bringing the parts into the assembly, all metal surfaces which are to be secured together, are cleaned to remove any grease or other contaminants that might interfere with a secure bond. Then all of the areas of the metal parts 15, 17, and 27 of the damper assembly which are to be bonded together are primed, and the primer allowed to dry to a layer 28. After the primer 28 has dried, a room temperature curable or heat curable adhesive layer 29 is applied over the primed areas, the adhesive being desirably in a fluent state when applied. Desirably the adhesive is applied to the primed areas of both the inertia members 15 and 17 and the plates 27. Where the adhesive is of the room temperature curing type, the assembly can then be pressed together axially and held in this position until the adhesive has set. Where the adhesive is of the type requiring elevated temperature curing, the adhesive may be applied and permitted to dry before assembling the parts together. Epoxy, polyurethane, modified acrylic, phenolic-nitrile, or other, adhesives may be used. In order to assure firm pressure of the adhesively bonded surfaces, the elastic rings 23 are preferably at least slightly thicker in the preassembly state so that when the inertia members 15 and 17 are brought to their final assembled relation with the edges of the outer edge flanges 18 abutting, the rings 23 will be placed under at least slight compression. The degree of compression may be selected to attain the desired operating tuning action in the elastic rings 23. To assist in effecting final assembly, a concentricity and clamping device or jig assembly similar to that disclosed in the aforesaid pending application may be employed. When the parts of the damper assembly have all been concentrically clamped together, the outer perimeter flanges 18 are seam welded together by the seam weld 19 whereby the assembly is permanently secured together. Such welding may be effected before or after, and preferably before heat curing the adhesive, where a heat curable adhesive is employed. After the assembly has been completed, testing for any possible leaks may be effected, and then the working chamber 12 of the damper filled with viscous damping medium. Because of the large bonded connections of the elastic rings 23 to the plate body 10 and the inertia members 15 and 17, substantially complete assurance against leakage past the elastic rings 23 is attained.

As depicted in FIG. 3, the damper embodies certain modifications, all or some of which may be embodied in any damper unit. Primed reference characters designate elements in FIG. 3 which correspond to elements in FIG. 1, and it will be understood that the description of such elements in connection with FIG. 1 applies equally to FIG. 3. For brevity, description with respect to some of the primed reference characters may therefore not be repeated. Where it is anticipated that the damper may be subjected to excessive radial thrusts or stresses, or even axial stresses or thrusts, which may tend to disturb prime functioning of the viscous damping capability of the damper, a spacer and support bearing 30 of substantially U-shaped cross section may be assembled about the outer diameter of the plate 5' with the generally channel-shaped ring having its groove facing radially inwardly with the perimeter of the plate received in the groove. The thickness of material of the bearing and spacer ring 30 should be such as to maintain substantially accurate shear film spaced relation between the plate body 10' and the confronting parallel working surfaces of the inertia members 15' and 17', within the working chamber 12'. By interposition of the ring 30 between the perimeter of the plate 5' and the inertia mass 11' radial and axial relative displacement is avoided. Adequate lubricant for the bearing and spacer member 30 may be provided by the viscous damping medium, i.e., silicone oil in the working chamber 12', although the preferred construction would involve self-lubricating bearing materials compatible with the silicone oils.

Instead of vulcanize bonding the elastic rings 23' to the body 10' of the plate 5', thin flat plate annular disks 31 which are rigidly unyielding in their flat plane are vulcanize bonded to the faces of the rings 23' which are to be attached to the plate body 10'. In the assembly the facing or bonding plates 31 may be bonded by means of adhesive to the plate body 10'. Thereby the advantages of secure attachment of the rings 23' to the plate body 10' are attained to similar effect as was described with respect to bonding of the rings 23 in FIG. 1 to the inertia members 15 and 17 by means of the disks 27 vulcanize bonded to the rings 23 and the disks 27 secured by adhesive to the members 15 and 17.

Whether the elastic rings 23' are secured to the plate body 10' by direct vulcanize bonding as in FIG. 1, or by means of the bonding disks 31, the disks 27' may be secured to respectively the inertia members 15' and 17' by welding. For this purpose, the inner edge portions of the members 15' and 17' are desirably turned generally axially outwardly to provide attachment and heat sink flanges 32 as shown. Matching and nested with the flanges 32 are generally axially outwardly extending annular flanges 33 of the inner diameters of the disks 27'. Then, to secure the assembly together, the outer ends of the nested flanges 32 and 33 are welded together as by laser beam welding or electron beam welding 34. This welding is accomplished within a small and very narrow and accurately placed heat zone so that the total amount of heat generated is very small whereby to maintain temperature of less then 300° F. at the rubber bond line with the disks 27'. On the other hand, if desired the welding 34 may be spot welding. In such instance, a sealant 35 will be applied prior to the welding process. A groove for this purpose is easily provided by designing the shape of the flanges 32 and 33 to define the groove at the bends where the flanges diverge from respectively the members 15' and 17' and the disks 27'.

In the modification shown in FIG. 4, reference numerals which are common to FIG. 3 are intended to represent similar elements as in FIG. 3 and the description applies with equal effect to such elements in FIG. 4. However, in FIG. 4, the disks 31' by which the elastic rings 23' are attached to the plate body 10', instead of being adhesively secured to the plate body 10', are welded thereto as by means of seam welding 37 as by means of laser beam or electron beam welding means, accomplished within a small and very narrow and accurately placed heat zone at the edges of respective radially outward extensions 38 of the disks 31'. Thereby the total amount of heat energy is very small and temperature at the rubber bond line with the disks 31' can be maintained at a temperature of less than 300° F. The seam welds 37 thoroughly seal against leakage of viscous damping medium from the working chamber 12' between the plate body 10' and the disks 31'.

It will be understood that variations and modifications may be effected without departing from the spirit and scope of the novel concepts of this invention.

We claim as our invention:

1. In a tuned viscous torsional vibration damper assembly of the type having circular supporting plate means with a radially outwardly extending circular body and a radially inner hub portion adapted to be secured to a rotary member such as a crankshaft subject to vibrations to be damped by the damper, said body being received concentrically within a radially inwardly opening annular working chamber of an annular inertia mass, a viscous damping medium in said chamber between shear film spaced working surfaces of said body and said inertia mass, said inertia mass having concentric annular grooves of substantial radial extent and located at opposite sides of and facing axially toward said body contiguous to the opening from said chamber, said grooves having axially directed annular face areas on said inertia mass facing toward oppositely axially facing face areas on said body, and elastic tuning spring, spacing and sealing rings of radial extent similar to that of the radial extent of said grooves and having opposite axially directed sides attached to and coupling said face areas of said inertia mass in said grooves with said face areas on said body, the improvement comprising:

separate substantially flat annular disks of substantially the same radial extent as said elastic rings;
    each of said disks being rigidly unyielding in its radial plane and having oppositely facing axially directed faces;
    one of said disks having one of its axially directed faces vulcanize bonded to one side of one of said elastic rings;
    another of said disks having one of its axially directed faces vulcanize bonded to one side of the other of said elastic rings;
    and adhesive means permanently rigidly securing said disks in place in fluid sealing relation against the face areas respectively opposed by the remaining axially directed faces of the disks.

2. A damper assembly according to claim 1, wherein said disks comprise thin metal elements.

3. A damper assembly according to claim 1, wherein said elastic rings are vulcanize bonded to said plate means body.

4. A damper assembly according to claim 3, wherein said plate means body has keying holes therethrough, and integral keying lugs connecting said elastic rings through said keying holes, said keying lugs supplementing said vulcanize bonding of the elastic rings to said plate means body and also facilitating molding and vulcanizing of the rings in place on the plate means body.

5. A damper assembly according to claim 1, including additional flat annular disks which are rigidly unyielding in their planes and which are vulcanize bonded to the opposite sides of said elastic rings, and means securing said additional disks to said face areas opposite to the face areas to which said first mentioned disks are rigidly secured.

6. In a method of making a tuned viscous torsional vibration damper assembly of the type having circular supporting plate means with a radially outwardly extending circular body and a radially inner hub portion adapted to be secured to a rotary member such as a crankshaft subject to vibrations to be damped by the damper, said body being received concentrically within a radially inwardly opening annular working chamber of an annular inertia mass, a viscous damping medium in said chamber between shear film spaced working surfaces of said body and said inertia mass, said inertia mass having concentric annular grooves of substantial radial extent and located at opposite sides of and facing axially toward said body contiguous to the opening from said chamber, said grooves having axially directed annular face areas on said inertia mass facing toward oppositely axially facing face areas on said body, and elastic tuning spring, spacing and sealing rings of radial extent similar to that of the radial extent of said grooves and having opposite axially directed sides attached to and coupling said face areas of said inertia mass in said grooves with said face areas on said body, the improvement comprising:

providing separate substantially flat annular disks of substantially the same radial extent as said elastic rings, and wherein each of said disks is rigidly unyielding in its radial plane and has oppositely facing axially directed faces;

vulcanize bonding one of said axially directed faces of one of said disks to one side of one of said elastic rings;

vulcanize bonding one of the axially directed faces of another of said disks to one side of the other of said elastic rings;

and permanently rigidly adhesively securing said disks in place in fluid sealing relation against the face areas respectively opposed by the remaining axially directed faces of the disks.

7. A method according to claim 6, comprising forming said disks from thin metal.

8. A method according to claim 6, comprising vulcanize bonding said elastic rings to said plate means body.

9. A method according to claim 6, comprising providing keying holes through said plate means body, and connecting said elastic rings together through said keying holes.

10. A method according to claim 6, comprising forming said plate means body with keying holes therethrough, vulcanizing keying lugs through said holes and connecting said rings, and thereby supplementing the vulcanize bonding of the elastic rings to said plate means body and also facilitating molding and vulcanizing of the rings in place on the plate means body.

11. A method according to claim 6, comprising vulcanize bonding to the opposite axial sides of said elastic rings additional flat annular disks which are rigidly unyielding in their planes, and securing such disks to said face areas opposite to the face areas to which said first mentioned disks are rigidly secured.

12. In a tuned viscous torsional vibration damper assembly of the type having circular supporting plate means with a radially outwardly extending circular body and a radially inner hub portion adapted to be secured to a rotary member such as a crankshaft subject to vibrations to be damped by the damper, said body being received concentrically within a radially inwardly opening annular working chamber of an annular inertia mass, a viscous damping medium in said chamber between shear film spaced working surfaces of said body and said inertia mass, and said inertia mass having concentric annular grooves at opposite sides of and facing axially toward said body contiguous to the opening from said chamber, with elastic tuning spring, spacing and sealing rings coupling opposing surface areas of said inertia mass in said grooves and opposing surface areas on said body, the improvement comprising:

said plate means body having keying holes therethrough in said surface areas and spaced from both radial edges of said elastic rings;

said elastic rings having faces vulcanize bonded to said surface areas on said plate means body;

and keying lugs comprising vulcanized material of said rings and connecting said elastic rings through said holes, said keying lugs supplementing said vulcanize bonding of the elastic rings to said surface areas on said body and also facilitating molding and vulcanizing of the rings in place on the plate means body;

flat annular disks which are rigidly unyielding in their planes vulcanize bonded to said opposite faces of the elastic rings;

and structural adhesive fixedly securing said disks to said surface areas of said inertia mass in said grooves.

13. A method of making a tuned viscous torsional vibration damper assembly of the type having circular supporting plate means with a radially outwardly extending circular body and a radially inner hub portion adapted to be secured to a rotary member such as a crankshaft subject to vibrations to be damped by the damper, said body being received concentrically within a radially inwardly opening annular working chamber of an annular inertia mass, a viscous damping medium in said chamber between shear film spaced working surfaces of said body and said inertia mass, and said inertia mass having concentric annular grooves at opposite sides of and facing axially toward said body contiguous to the opening from said chamber, with elastic tuning spring, spacing and sealing rings coupling opposing surface areas of said inertia mass in said grooves and opposing surface areas on said body, the improvement comprising:

providing in said plate means body keying holes extending through said surface areas and spaced from both radial edges of said elastic rings;

vulcanize bonding axial faces of said elastic rings to said surface areas of said plate body means and providing keying lugs by vulcanizing the same material as said elastic rings and thereby integrally connecting said elastic rings through said holes;

vulcanize bonding to the axially opposite face of each of said rings a flat annular disk which is rigidly unyielding in its plane;

and adhesively fixedly securing said disks to said surface areas of said inertia mass in said annular grooves.

* * * * *